US011983982B2

(12) United States Patent
Namaziyan

(10) Patent No.: US 11,983,982 B2
(45) **Date of Patent: *May 14, 2024**

(54) DYNAMIC INDICATION OF AWARDS OF AN AWARD GENERATOR IN A GAMING ENVIRONMENT

(71) Applicant: IGT, Las Vegas, NV (US)

(72) Inventor: Babak Namaziyan, San Francisco, CA (US)

(73) Assignee: IGT, Las Vegas, NV (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/534,073

(22) Filed: Nov. 23, 2021

(65) Prior Publication Data

US 2022/0084353 A1 Mar. 17, 2022

Related U.S. Application Data

(63) Continuation of application No. 16/117,615, filed on Aug. 30, 2018, now Pat. No. 11,302,139.

(51) Int. Cl.
*G07F 17/32* (2006.01)
*G07F 17/34* (2006.01)

(52) U.S. Cl.
CPC ...... *G07F 17/3213* (2013.01); *G07F 17/3209* (2013.01); *G07F 17/34* (2013.01)

(58) Field of Classification Search
CPC ............. G07F 17/3204; G07F 17/3213; G07F 17/326; G07F 17/34
See application file for complete search history.

(56) References Cited

U.S. PATENT DOCUMENTS

| | | | |
|---|---|---|---|
| 4,492,378 A | 1/1985 | Williams | |
| 5,092,598 A | 3/1992 | Kamille | |
| 5,553,851 A | 9/1996 | Malavazos et al. | |
| 5,769,716 A | 6/1998 | Saffari et al. | |
| 5,788,573 A | 8/1998 | Baerlocher et al. | |
| 5,996,997 A | 12/1999 | Kamille | |
| 6,059,658 A | 5/2000 | Mangano | |
| 6,105,962 A | 8/2000 | Malavazos et al. | |
| 6,217,022 B1 | 4/2001 | Astaneha | |
| 6,315,663 B1 | 11/2001 | Sakamoto | |
| 6,364,767 B1 | 4/2002 | Brossard et al. | |
| 6,561,512 B2 | 5/2003 | Luciano et al. | |
| 6,783,455 B2 | 8/2004 | Glavich | |
| 7,354,342 B2 | 4/2008 | Paulsen et al. | |
| 7,473,173 B2 | 1/2009 | Peterson et al. | |
| 7,503,847 B2 | 3/2009 | Baerlocher | |
| 7,591,722 B2 | 9/2009 | Baerlocher et al. | |
| 7,601,061 B2 | 10/2009 | Jackson | |
| 7,708,628 B2 | 5/2010 | Baerlocher | |
| 7,833,095 B2 | 11/2010 | Cuddy et al. | |
| 7,922,575 B2 * | 4/2011 | Jankowski | G07F 17/32 463/16 |
| 8,142,273 B2 | 3/2012 | Williams et al. | |
| 8,282,461 B2 | 10/2012 | Berman et al. | |
| 9,017,159 B2 * | 4/2015 | Moody | G07F 17/3293 463/20 |

(Continued)

*Primary Examiner* — Dmitry Suhol
*Assistant Examiner* — Jason Pinheiro
(74) *Attorney, Agent, or Firm* — Neal, Gerber & Eisenberg LLP

(57) ABSTRACT

Gaming systems and methods that utilize a dynamic indicator to indicate one or more awards of one or more sections of an award generator.

20 Claims, 12 Drawing Sheets

(56) References Cited

U.S. PATENT DOCUMENTS

| | | | | |
|---|---|---|---|---|
| 9,111,414 | B1 | 8/2015 | Sirois et al. | |
| 9,613,485 | B2 | 4/2017 | Barragan | |
| 2002/0065124 | A1* | 5/2002 | Ainsworth | G07F 17/34 463/20 |
| 2003/0045345 | A1 | 3/2003 | Berman | |
| 2003/0069068 | A1 | 4/2003 | Kaminkow | |
| 2003/0186736 | A1 | 10/2003 | Benbrahim | |
| 2004/0043809 | A1 | 3/2004 | Gomez | |
| 2004/0195773 | A1* | 10/2004 | Masci | G07F 17/3244 273/317 |
| 2005/0049031 | A1* | 3/2005 | Jackson | G07F 17/34 463/20 |
| 2005/0054421 | A1 | 3/2005 | Hughs-Baird et al. | |
| 2005/0143165 | A1* | 6/2005 | Berman | G07F 17/32 463/20 |
| 2006/0019738 | A1 | 1/2006 | Baerlocher et al. | |
| 2006/0030387 | A1 | 2/2006 | Jackson | |
| 2006/0148554 | A1* | 7/2006 | Hornik | G07F 17/3286 463/16 |
| 2006/0160605 | A1 | 7/2006 | Hornik et al. | |
| 2007/0021187 | A1 | 1/2007 | Gauselmann | |
| 2007/0026923 | A1 | 2/2007 | Muir | |
| 2007/0191087 | A1 | 8/2007 | Thomas | |
| 2007/0270208 | A1 | 11/2007 | Caspers | |
| 2008/0045300 | A1* | 2/2008 | Quayle | G07F 17/34 463/18 |
| 2008/0113775 | A1 | 5/2008 | Williams | |
| 2008/0274786 | A1* | 11/2008 | Wilson | G07F 17/3244 463/20 |
| 2008/0300037 | A1 | 12/2008 | Wilson | |
| 2009/0191957 | A1 | 7/2009 | Curtin | |
| 2010/0004048 | A1* | 1/2010 | Brito | G07F 17/3265 463/20 |
| 2011/0201406 | A1 | 8/2011 | Jaffe | |
| 2011/0223983 | A1 | 9/2011 | Schwartz et al. | |
| 2012/0015707 | A1* | 1/2012 | Hornik | G07F 17/3258 463/20 |
| 2013/0310136 | A1* | 11/2013 | Kitamura | G07F 17/3213 463/20 |
| 2014/0087830 | A1 | 3/2014 | Gobe | |
| 2014/0087832 | A1 | 3/2014 | Zoltewicz et al. | |
| 2014/0364193 | A1 | 12/2014 | Williamson | |
| 2016/0104344 | A1 | 4/2016 | Meyer | |
| 2016/0125689 | A1 | 5/2016 | Hoffman et al. | |
| 2016/0300454 | A1 | 10/2016 | Uss et al. | |
| 2018/0033238 | A1 | 2/2018 | Berman | |

* cited by examiner

1000

DYNAMIC INDICATION OF AWARDS OF AN AWARD GENERATOR IN A GAMING ENVIRONMENT

PRIORITY CLAIM

This application is a continuation of, claims priority to and the benefit of U.S. patent application Ser. No. 16/117,615, filed on Aug. 30, 2018, the entire contents of which is incorporated by reference herein.

BACKGROUND

Gaming machines may provide players awards in primary games. Gaming machines generally require the player to place a wager to activate the primary game. The award may be based on the player obtaining a winning symbol or symbol combination and on the amount of the wager.

BRIEF SUMMARY

In certain embodiments, the present disclosure relates to a gaming system including a processor, and a memory device which stores a plurality of instructions which when executed by the processor, responsive to an occurrence of an award generator triggering event, cause the processor to cause a display, by a display device, of an award generator comprising a plurality of levels, wherein each level comprises an open section and a closed section. When executed by the processor, the instructions cause the processor to, for each level of the award generator, randomly determine an orientation of that level of the award generator, cause a display, by the display device, of the randomly determined orientation of each of the levels of the award generator, and determine a quantity of sections of the award generator indicated by an indicator associated with the award generator, wherein the determined quantity of sections of the award generator is based on any open sections of different levels being aligned in accordance with the randomly determined orientation of those different levels. When executed by the processor, the instructions cause the processor to determine a total award based on any awards associated with any of the determined quantity of sections of the award generator indicated by the indicator, and cause a display, by the display device, of the determined total award.

In certain embodiments, the present disclosure relates to a gaming system including a processor, and a memory device which stores a plurality of instructions. When executed by the processor for a first play of a game, the instructions cause the processor to cause a display, by a display device, of a first configuration of an indicator of an award generator, wherein the first configuration comprises a first quantity of indicated sections of the award generator, and the first configuration is based on a first quantity of open sections of the award generator being randomly aligned, and cause a display, by the display device, of a first award, wherein the first award is based on any awards associated with the first quantity of indicated sections of the award generator. When executed by the processor for a second play of a game, the instructions cause the processor to cause a display, by the display device, of a second, different configuration of the indicator of the award generator, wherein the second configuration comprises a second, different quantity of indicated sections of the award generator, and the second configuration is based on a second quantity of open sections of the award generator being randomly aligned, and cause a display, by the display device, of a second award, wherein the second award is based on any awards associated with the second quantity of indicated sections of the award generator.

In certain embodiments, the present disclosure relates to a method of operating a gaming system, the method includes displaying, by a display device, an award generator comprising a plurality of levels, wherein each level comprises an open section and a closed section, and responsive to an occurrence of an award generator triggering event, for each level of the award generator, randomly determining, by a processor, an orientation of that level of the award generator. The method also includes displaying, by the display device, the randomly determined orientation of each of the levels of the award generator, and determining, by the processor, a quantity of sections of the award generator indicated by an indicator associated with the award generator, wherein the determined quantity of sections of the award generator is based on any open sections of different levels being aligned in accordance with the randomly determined orientation of those different levels. The method further includes determining, by the processor, a total award based on any awards associated with any of the determined quantity of sections of the award generator indicated by the indicator, and displaying, by the display device, the determined total award.

Additional features are described in, and will be apparent from, the following Detailed Description and the figures.

DETAILED DESCRIPTION

Dynamic Indicator

Figure 1:
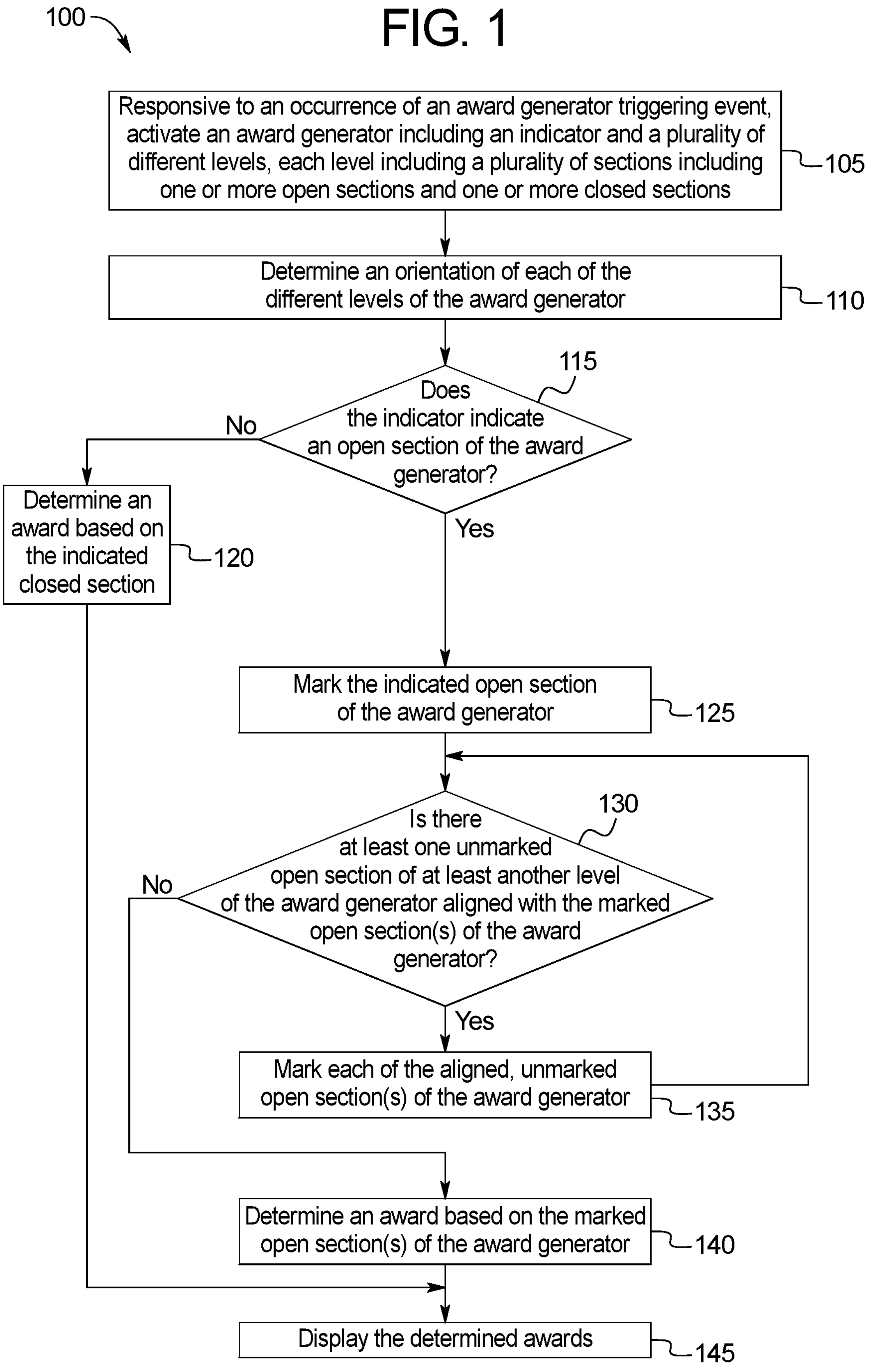
FIG. 1 is a flow chart an example process for operating a gaming system that utilizes a dynamic indicator of an award generator.

In various embodiments, the present disclosure relates generally to gaming systems and methods that utilize a dynamic indicator to indicate one or more awards of one or more sections of an award generator.

More specifically, in various embodiments, upon an occurrence of an award generator triggering event, the gaming system disclosed herein activates an award generator. The award generator includes a plurality of different levels wherein each level includes a plurality of different sections. The award generator is associated with an indicator and certain of the sections of certain of the levels of the award generator are associated with one of a plurality of different awards. Additionally, certain of the sections of certain of the levels of the award generator are open sections and certain of the sections of certain of the levels of the award generator are closed sections. For example, the award generator includes a series of concentric wheels wherein one or more of the sections of an outer concentric wheel are open sections to potentially form a path to an inner concentric wheel (and one or more of the sections of the outer concentric wheel are closed sections unable to form any paths to the inner concentric wheel).

In operation of these embodiments, the activated award generator randomly determines an orientation of each of the levels of the award generator. Following these random determinations, the gaming system determines whether any paths are formed from the indicator of the award generator and by any aligned open sections of one or more of the levels of the award generator. In these embodiments, if the indicator of the award generator indicates an open section, the gaming system forms a path to the next section of the next level of the award generator and determines whether any additional path is formed based on that section of the next level of the award generator being an open or closed section. For example, following the separate spinning of each of a series of concentric wheels, the gaming system determines whether an indicator points to an open or closed section of the outer concentric wheel, wherein if the indicator points to an open section of the outer concentric wheel, the gaming system forms a path such that the indicator points to a section of the inner concentric wheel. These determinations continue until the indicator indicates a closed section and the formed path, if any, ends. As such, the gaming system provides a dynamic indicator which forms zero, one or more paths based on the orientation of the open sections and closed sections of the different levels of an award generator. In these embodiments, upon a determination that the indicator indicates a closed section and the formed path, if any, ends, the gaming system determines a total award based on the awards of the sections of the award generator indicated by the indicator of the award generator and any path formed, via the alignment of zero, one or more open sections, in association with the indicator. The gaming system disclosed herein, thus, provides a dynamic indicator wherein for different plays of the game, the quantity of sections of the award generator that the indicator indicates varies based on the orientation of the open sections of the different levels of the award generator. Such a configuration alters the volatility of the gaming system (and thus alters the operation of the gaming system) by ensuring that different indicators are utilized based on the random determinations of the award generator itself.

FIG. 1 is a flowchart of an example process or method 100 of operating the gaming system of the present disclosure. In various embodiments, the process 100 is represented by a set of instructions stored in one or more memories and executed by one or more processors. Although the process 100 is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In operation of this example embodiment, as indicated by block 105, responsive to an occurrence of an award generator triggering event, the gaming system activates an award generator including an indicator and a plurality of different levels, where each level includes one or more open sections and one or more closed sections. In certain embodiments, the award generator triggering event includes the placement of a wager on the play of a primary game. In another embodiment, the award generator triggering event occurs based on a displayed event associated with a play of a primary game. For example, the award generator triggering event is a symbol-driven triggering event that occurs during a play of a primary game. In another embodiment, the award generator triggering event occurs based on an event independent of any displayed event associated with the play of a primary game.

In various embodiments, prior to activating the award generator, the gaming system displays, via a display device, the award generator including a default indicator (i.e., an indicator not associated with any formed paths) and the plurality of different levels.

In various embodiments, the quantity of open sections and closed sections of each of one or more levels can vary. In various embodiments, the sizes of each of the open sections and closed sections of each of one or more levels can vary. For example, in certain embodiments, the sizes of each of the open sections of a level may be relatively larger than the sizes of each of the closed sections of that level. In other embodiments, the sizes of each of the closed sections of a level may be relatively larger than the sizes of each of the open sections of that level. In other embodiments, the sizes of each of the sections varies based on the relative amount of the award associated with the respective sections.

In various embodiments, the gaming system activates the award generator by spinning each of the different levels of the award generator. In other embodiments, the gaming system activates the award generator by causing each of the different levels of the award generator to move back and forth. In other embodiments, the gaming system activates the award generator by causing each of the different levels of the award generator to move up and down.

Figure 2A:
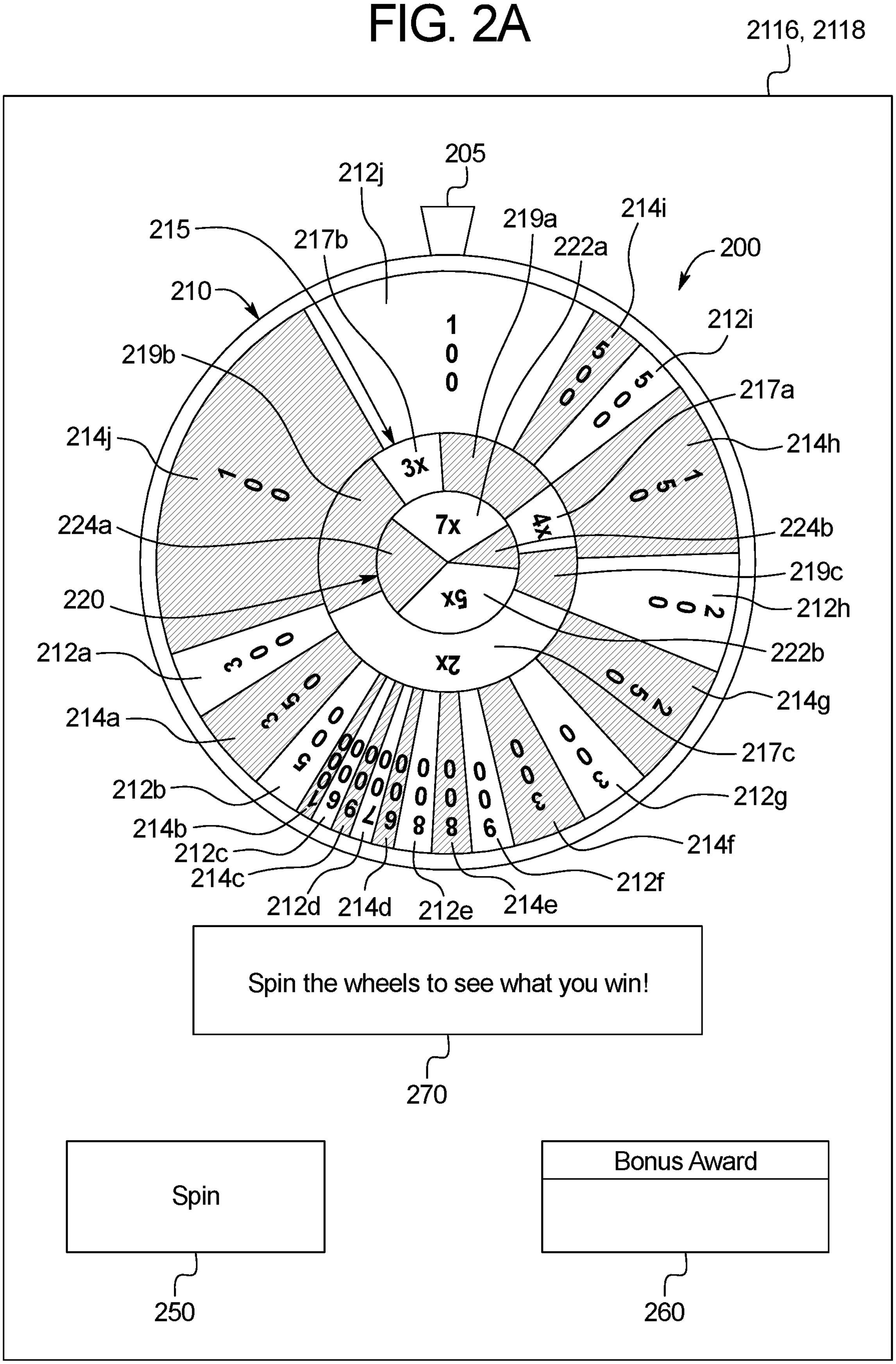
FIGS. 2A, 2B, 2C, 2D, 2E, 2F, and 2G are screenshots showing the operation of utilizing a dynamic indicator to indicate one or more awards of one or more sections of an award generator.

Referring to FIG. 2A, responsive to an occurrence of an award generator triggering event, the gaming system displays, such as on a display device 2116 or 2118 (described below), an award generator 200 and an indicator 205. In this example embodiment, the award generator 200 is associated with three concentric wheels 210, 215, and 220. Each of the concentric wheels 210, 215, and 220 include a plurality of sections. In this example embodiment, each of the sections of the concentric wheels 210, 215, and 220 is identified as an open section or a closed section.

More specifically, in this example embodiment, the first (or outer) wheel 210 includes a plurality of open sections 212 and a plurality of closed sections 214. In this example embodiment, each of the sections 212 and 214 of the outer wheel 210 are associated with an award of a quantity of credits (e.g., an award of 100 credits, 150 credits, 500 credits, etc.). For example, the outer wheel 210 includes: a first open section 212*a* associated with an award of 300 credits, a second open section 212*b* associated with an award of 500 credits, a third open section 212*c* associated with an award of 600 credits, a fourth open section 212*d* associated with an award of 700 credits, a fifth open section 212*e* associated with an award of 800 credits, a sixth open section 212*f* associated with an award of 900 credits, a seventh open section 212*g* associated with an award of 300 credits, an eighth open section 212*h* associated with an award of 200 credits, a ninth open section 212*i* associated with an award of 500 credits, and a tenth open section 212*j* associated with an award of 100 credits. The outer wheel 210 also includes: a first closed section 214*a* associated with an award of 350 credits, a second closed section 214*b* associated with an award of 1000 credits, a third closed section 214*c* associated with an award of 900 credits, a fourth closed section 214*d* associated with an award of 600 credits, a fifth closed section 214*e* associated with an award of 800 credits, a sixth closed section 214*f* associated with an award of 300 credits, a seventh closed section 214*g* associated with an award of 250 credits, an eighth closed section 214*h* associated with an award of 150 credits, a ninth closed section 214*i* associated with an award of 500 credits, and a tenth closed section 214*j* associated with an award of 100 credits.

Since each of the sections 212 and 214 of the outer wheel 210 are associated with a non-zero credit value, in this example embodiment, the gaming system provides a randomly determined non-zero credit value as an award for each spin of the award generator 200.

The second (or middle) wheel 215 includes a plurality of open sections 217 and a plurality of closed sections 219. The third (or inner) wheel 220 includes a plurality of open sections 222 and a plurality of closed sections 224. In this example embodiment, each of the open sections 217 of the middle wheel 215 and each of the open sections 222 of the inner wheel 220 is associated with an award of a modifier (e.g., an award of a 2× multiplier, a 3× multiplier, etc.). For example, the middle wheel 215 includes: a first open section 217*a* associated with an award of a 4× multiplier, a second open section 217*b* associated with an award of a 3× multiplier, and a third open section 217*c* associated with an award of a 5× multiplier. The inner wheel 220 includes a first open section 222*a* associated with an award of a 7× multiplier and a second open section 222*b* associated with an award of a 5× multiplier. Each of the closed sections 219 of the middle wheel 215 and each of the closed sections 224 of the inner wheel 222 is not associated with an award.

The outer wheel 210 completely surrounds the middle wheel 215, and the middle wheel 215 completely surrounds the inner wheel 220. In this example embodiment, the gaming system cannot mark an open section of a wheel unless that open section is aligned with a marked open section of another wheel or aligned with the indicator 205. That is, the gaming system marks an open section of a wheel when that open section is aligned with a marked open section of another wheel or when that open section is aligned with the indicator 205. As such, in this example embodiment, if the indicator 205 is aligned with one of the closed sections 214 of the outer wheel 210, then the gaming system cannot mark any of the open sections 217 of the middle wheel 215 or any of the open sections 222 of the inner wheel 220. Additionally, in this example embodiment, an open section 222 of the inner wheel 220 is unmarkable until the gaming system marks at least one open section 217 of the middle wheel 215, and an open section 217 of the middle wheel 215 is unmarkable until the gaming system marks at least one open section 212 of the outer wheel 210. However, the gaming system is not constrained to marking open sections going in only one direction (e.g., from the outer wheel 210 to the inner wheel 220). That is, in this example embodiment, an open section 217 of the middle wheel 215 may be marked when the open section 217 of the middle wheel 215 is aligned with a marked open section 212 of the outer wheel 210 or aligned with a marked open section 222 of the inner wheel 220.

In this example embodiment, the gaming system also displays a spin button 250 that, when actuated by a player, causes the gaming system to spin the concentric wheels 210, 215, and 220. The gaming system also displays a bonus award meter 260 that displays any awards won during the play of the award generator 200 (in credit or currency form). While any credit balances, any wagers, and any awards are displayed as amounts of monetary currency or credits in this example embodiment, one or more of such credit balances, such wagers, and such awards may be for any suitable non-monetary credits or currency, promotional credits, and/or player tracking points or credits. The gaming system also displays a message box 270. As shown in FIG. 2A, the gaming system displays the following message in the message box 270: "Spin the wheels to see what you win!"

In this example embodiment, the gaming system enables the player to provide a spin input (i.e., via the spin button 250) to initiate a spin of the award generator 200. In other embodiments, the gaming system automatically initiates the spinning of the plurality of concentric wheels 210, 215, and 220 of the award generator 200 following the displaying of the award generator 200. In certain embodiments, the gaming system automatically initiates the spinning of the plurality of concentric wheels 210, 215, and 220 of the award generator 200 after a designated period of time passes without the gaming system receiving an actuation of the spin button 250.

Figure 2B:
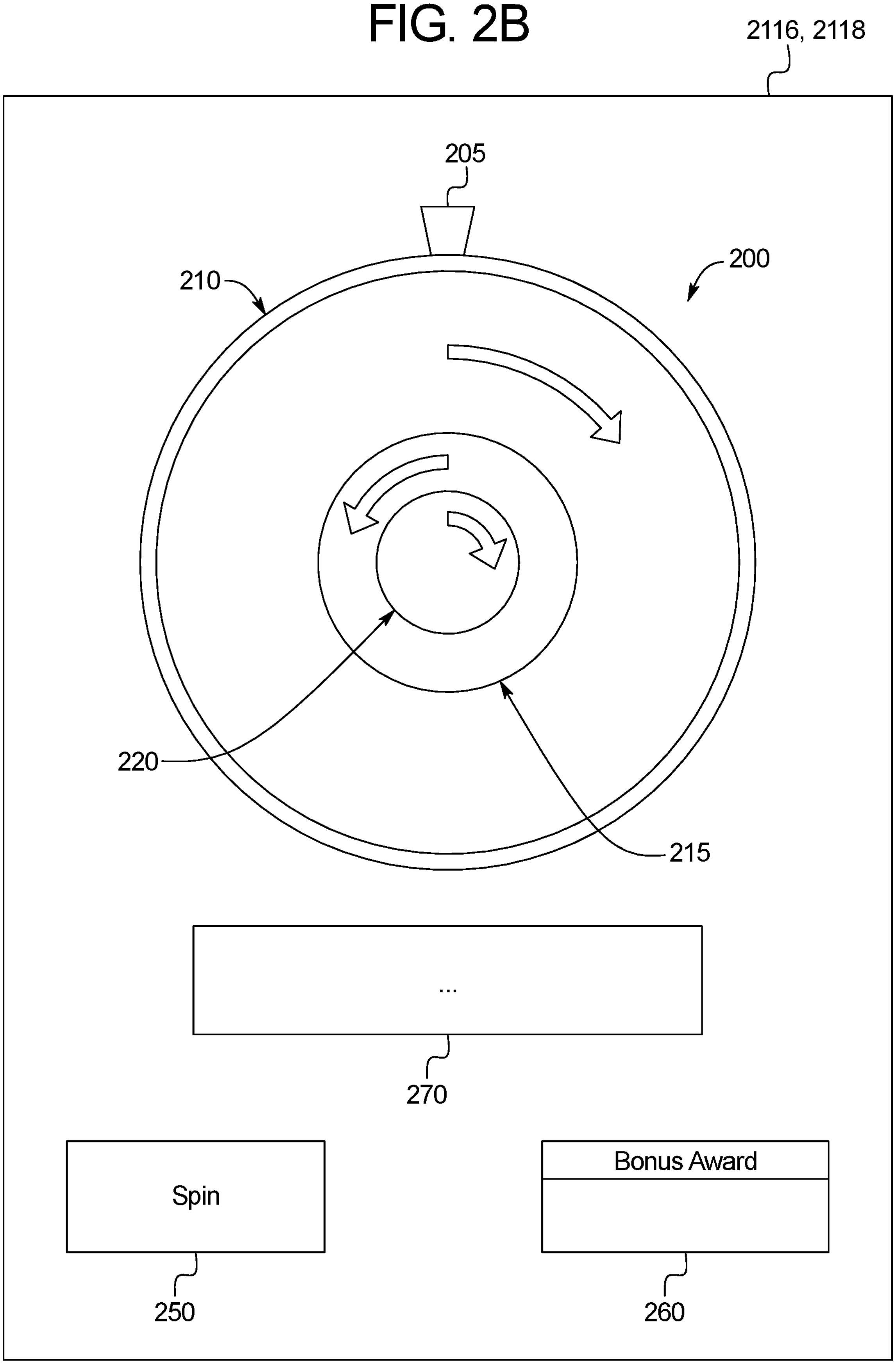

As shown in FIG. 2B, after receiving an actuation of the spin button 250, the gaming system spins the concentric wheels 210, 215, and 220. In this example embodiment, each of the concentric wheels 210, 215, and 220 spins in a different direction from the wheel(s) adjacent to it. In various embodiments, each of the plurality of wheels spins independent of the other wheels. In certain embodiments, at least two of the plurality of wheels 210, 215, and 220 spin at different speeds. In certain embodiments, the wheels 210, 215, and 220 start and/or stop spinning sequentially. For example, the outer wheel 210 stops spinning first, the middle wheel 215 stops spinning second, and the inner wheel 220 stops spinning third. In other embodiments, the plurality of wheels 210, 215, and 220 each spin in the same direction at different speeds. In other embodiments, the plurality of wheels each spin together in the same direction at the same speed. As depicted in FIG. 2B, in this example embodiment, while the plurality of wheels 210, 215, and 220 are spinning, the gaming system displays the following message in the message box 260: " . . . "

Returning to the process 100 of FIG. 1, the gaming system determines an orientation for each of the different levels of the award generator, as indicated by block 110. For example, the gaming system randomly determines an orientation for each of the different levels of the award generator. In various embodiments, the random determination of the orientation of the different levels of the award generator may be a weighted random determination in which certain sections (such as those open sections associated with relatively high credit values and/or multipliers) have a lower probability of aligning with the indicator than other sections (such as those open sections associated with relatively low credit values and/or multipliers).

Returning to the process 100 of FIG. 1, the gaming system then determines whether the indicator indicates an open section of the award generator, as indicated by diamond 115. For example, the indicator 205 may indicate an open section (e.g., one of the open sections 212 of the outer wheel 210) or a closed section (e.g., one of the closed sections 214 of the outer wheel 210). If, as indicated by diamond 115, the gaming system determines that the indicator does not indicate an open section of the award generator (i.e., the indicator 205 indicates a closed section 214 of the outer wheel 210), then the gaming system determines an award based on the indicated closed section, as indicated by block 120. For example, the gaming system determines that the award corresponds to the credit value associated with the indicated closed section. After determining the award based on the indicated closed section, the gaming system displays the determined awards, as indicated by block 145.

Figure 2C:
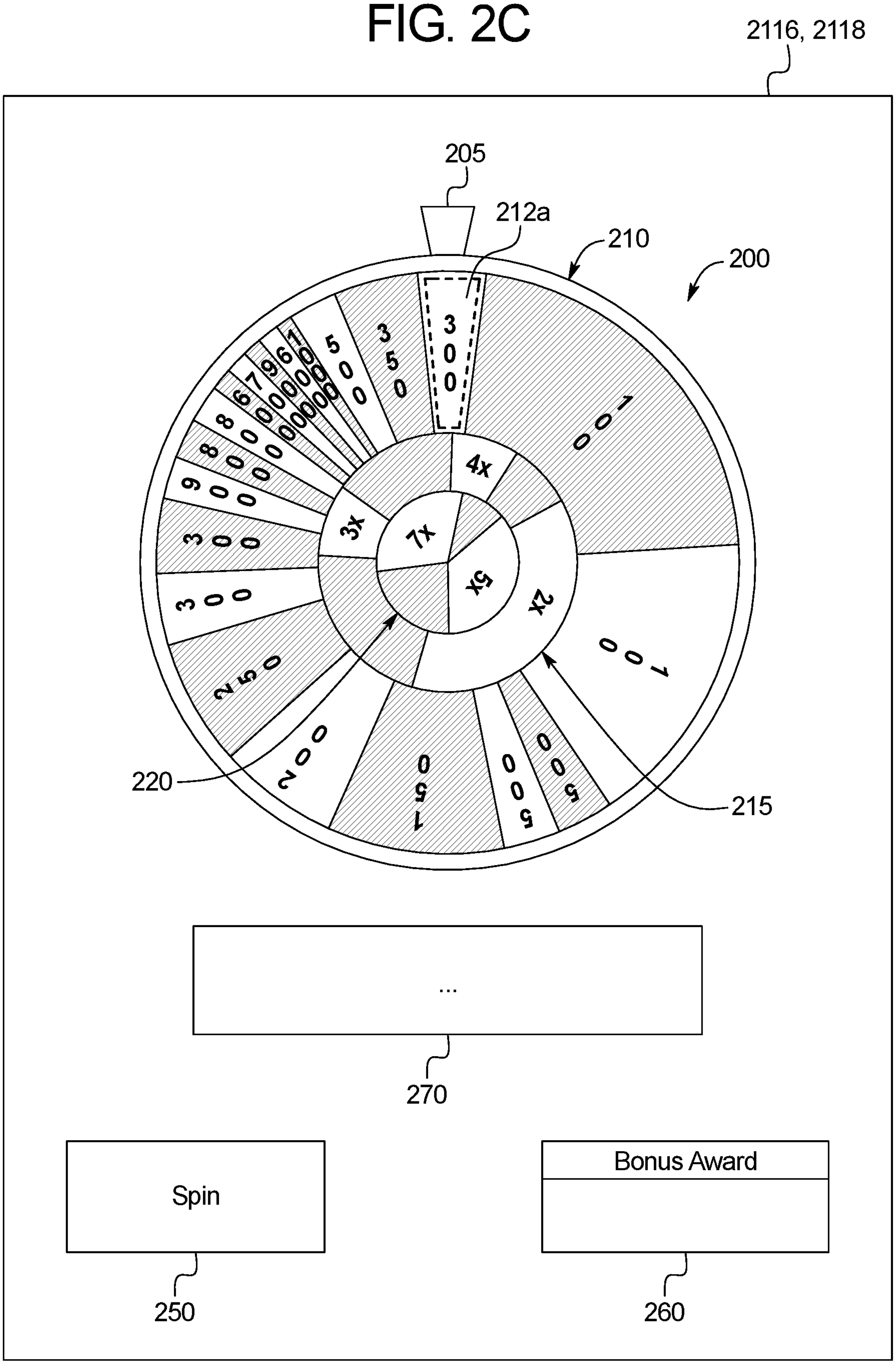
Figure 2D:
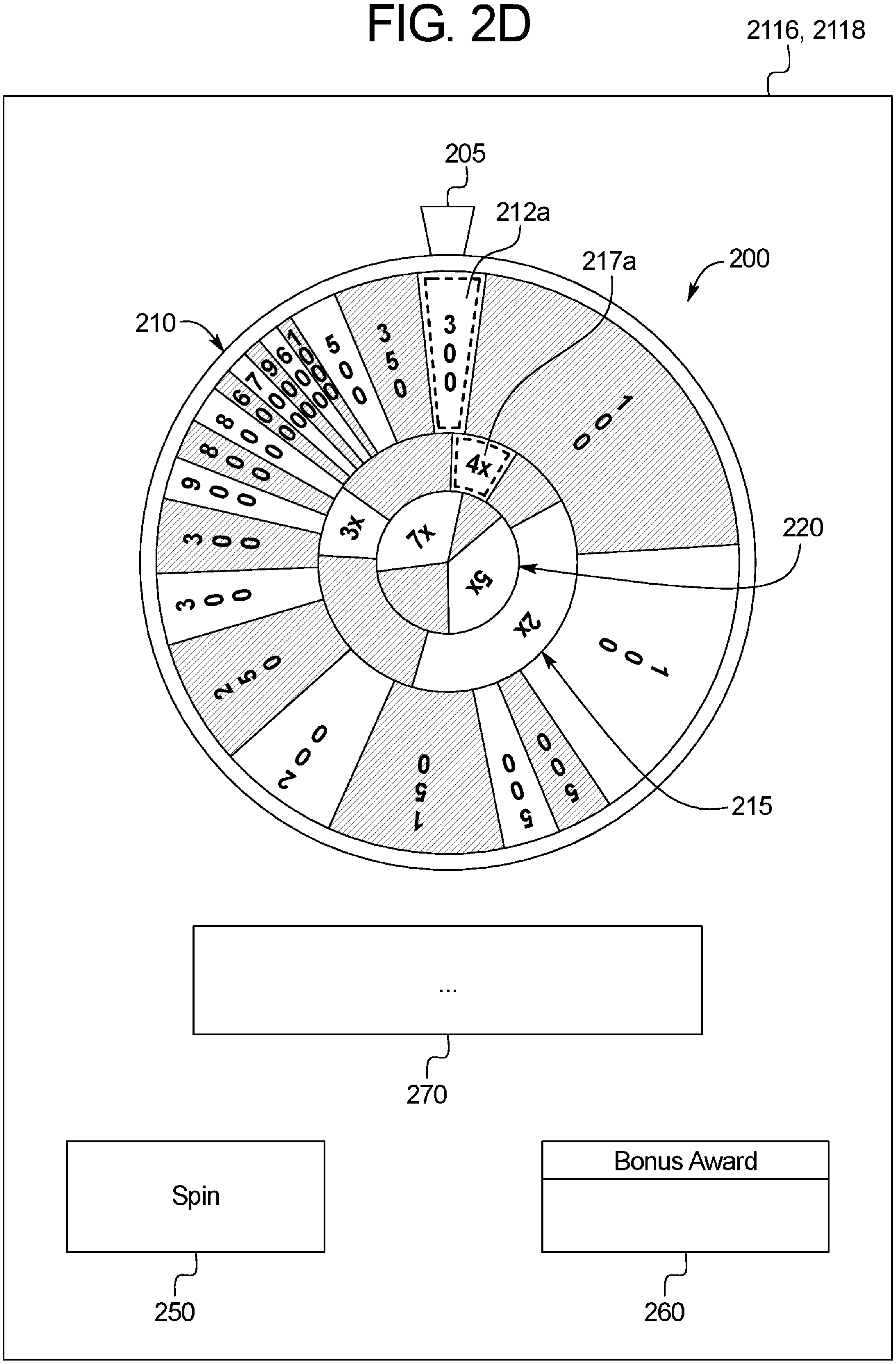
Figure 2E:
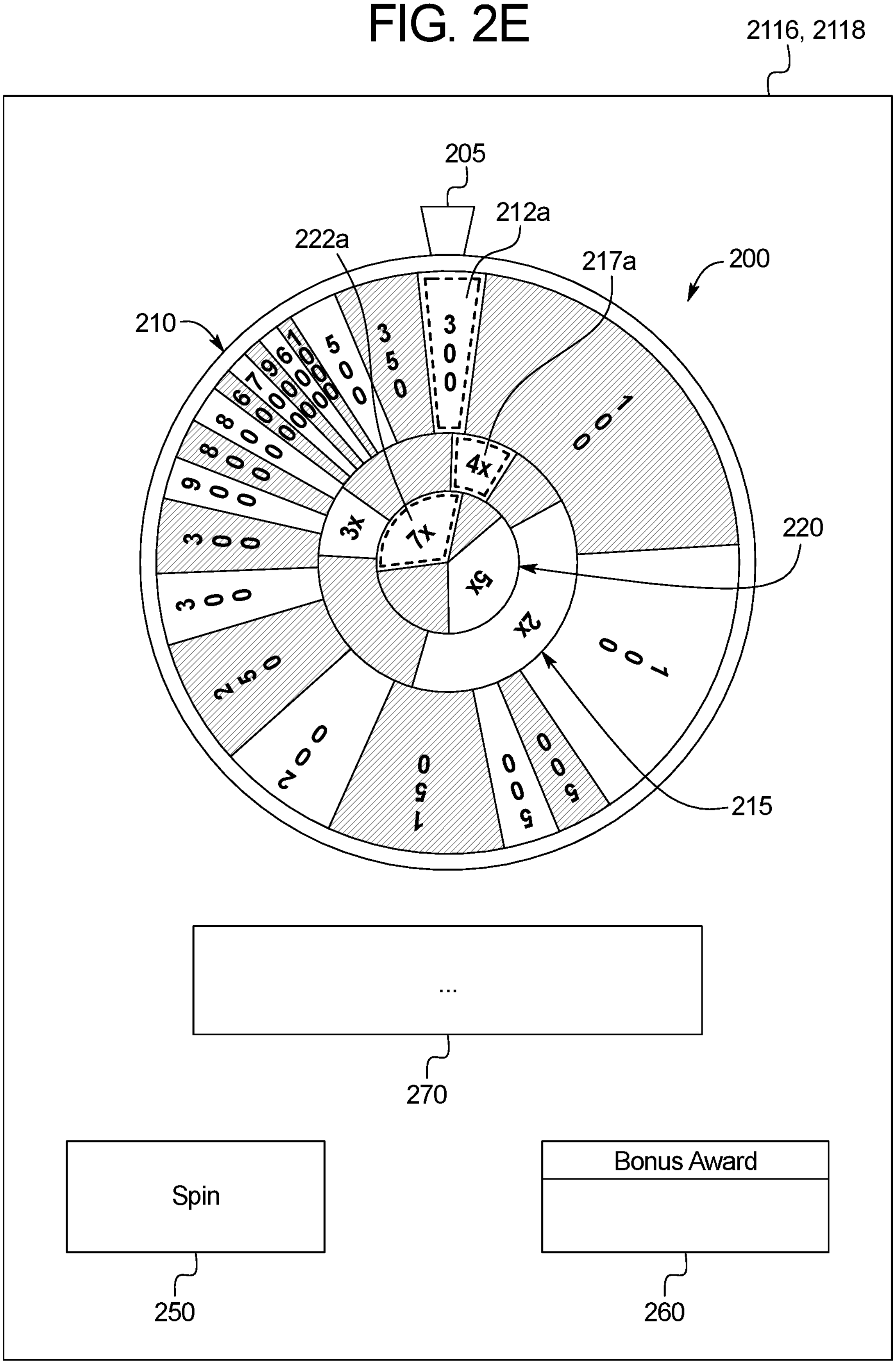
Figure 2F:
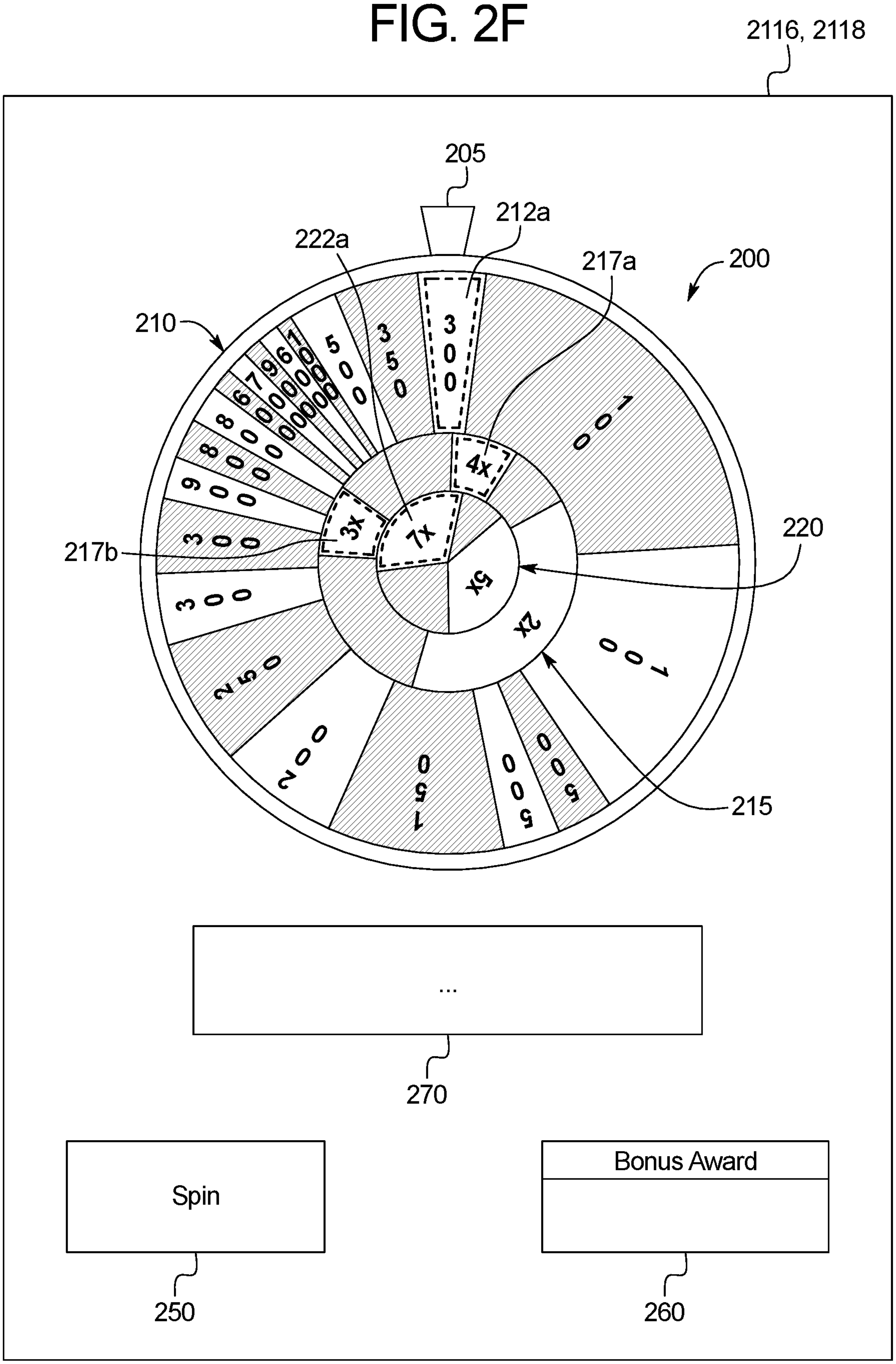

If, as indicated by diamond 115, the gaming system determines that the indicator indicates an open section of the award generator, then the gaming system marks the indicated open section of the award generator. As shown in FIG. 2C, after spinning each of the concentric wheels 210, 215, and 220, the gaming system stops the concentric wheels 210, 215, and 220. Additionally, in this example embodiment, the indicator 205 indicates the first open section 212*a* of the outer wheel 210 of the award generator 200. In this example embodiment, the gaming system marks the indicated open section 212*a* of the outer wheel 210 by adding a dashed line to the inner perimeter of the indicated open section. However, it should be appreciated that other techniques for displaying a marked open section may additionally or alternatively be used, such as highlighting the indicated open section, bolding the indicated open section, displaying a symbol in the indicated open section, etc.

Once the gaming system has marked the indicated open section, as indicated by block 125, the gaming system determines whether there is at least one unmarked open section of at least another level of the award generator aligned with the marked open section(s) of the award generator, as indicated by diamond 130. As used herein, a marked open section is “aligned” with an unmarked open section when a path can be formed from the marked open section of one level to an unmarked open section of another level of the award generator without passing through a closed section. Thus, for two open sections to be aligned does not require that, for example, the centers of the two open sections overlap. Rather, as long as any portion of the marked open section overlaps with a portion of an unmarked open section, the gaming system determines that the two sections are aligned.

If the gaming system determines that there is at least one unmarked open section of at least another level of the award generator that is aligned with a marked open section of the award generator, as indicated by diamond 130, then the gaming system marks each of the aligned, unmarked open section(s) of the award generator, as indicated by block 135. The process 100 then returns to diamond 130 to determine whether there is at least one unmarked open section of at least another level of the award generator aligned with the marked open section(s) of the award generator, as indicated by diamond 130.

Figure 2G:
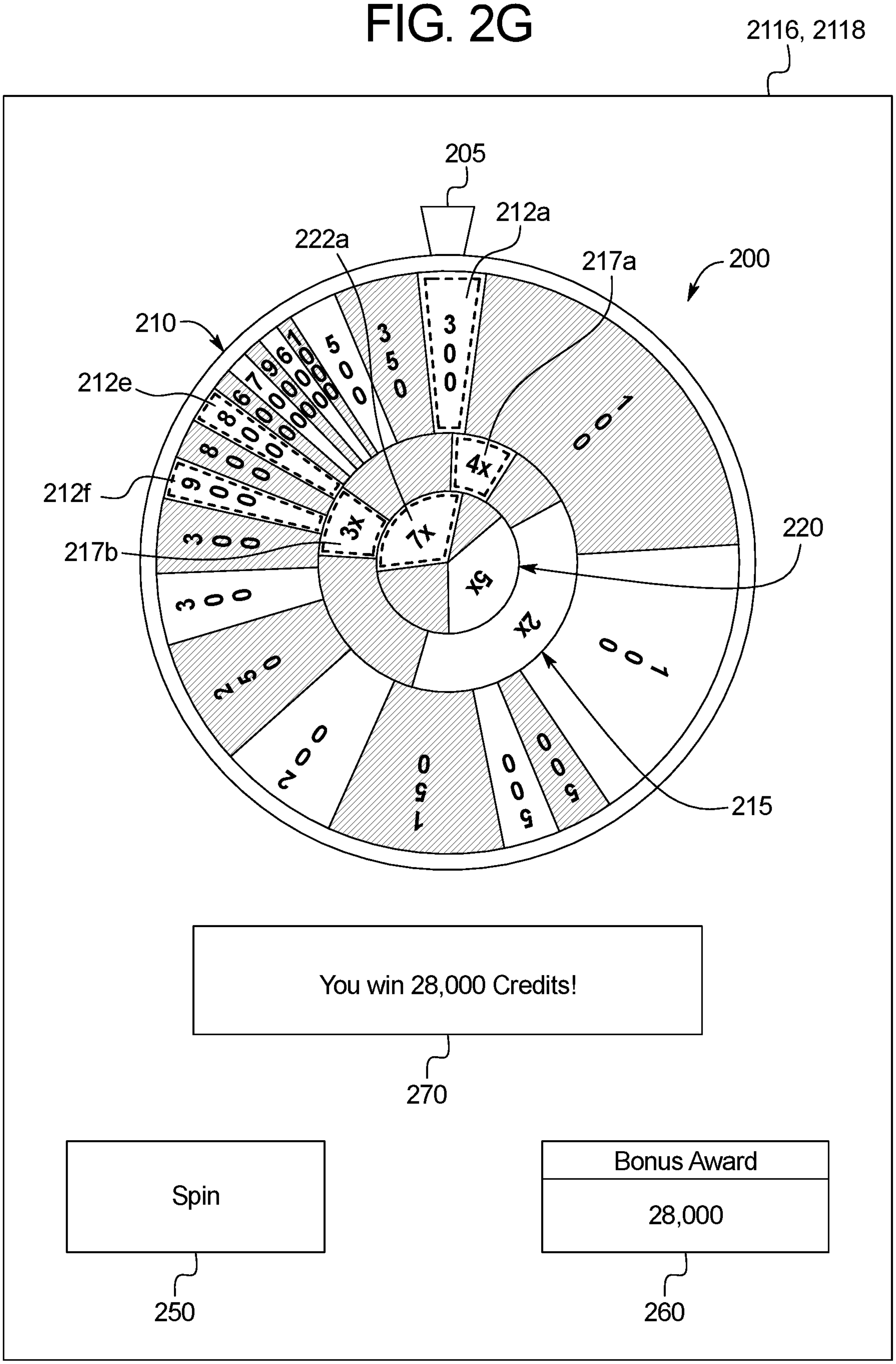

As shown in FIGS. 2D, 2E, 2F, and 2G, the gaming system iteratively marks unmarked open sections of different levels of the award generator that are aligned with marked sections of the award generator. Furthermore, for each iteration, the gaming system is able to mark unmarked open section(s) in any direction of travel with respect to a marked open section. For example, during a first iteration, the gaming system marks an open section 217 of the middle wheel 215, and then during a second, subsequent iteration, the gaming system may mark an aligned and unmarked open section 212 of the outer wheel 210 and/or an aligned and unmarked open section 222 of the inner wheel 220. Referring to FIG. 2G, the gaming system has marked open sections 212*a*, 212*e*, and 212*f* of the outer wheel 210, has marked open sections 217*a* and 217*b* of the middle wheel 215, and has marked open section 222*a* of the inner wheel 220. As shown in FIG. 2G, none of the marked open sections 212*a*, 212*e*, 212*f*, 217*a*, 217*b*, or 222*a* is aligned with an unmarked open section of another level of the award generator.

If (or once) the gaming system determines that no marked sections of the award generator align with any unmarked open sections of another level of the award generator, as indicated by diamond 130, then the gaming system determines an award based on the marked open section(s) of the award generator, as indicated by block 140. In certain embodiments, the gaming system determines that no marked sections of the award generator align with any unmarked open sections of another level of the award generator because all of the open sections of the award generator are marked open sections. In certain embodiments, the gaming system determines that no marked sections of the award generator align with any unmarked open sections of another level because each of the marked sections are aligned with closed sections (e.g., the marked open sections form one or more paths that each terminate at one or more closed sections).

Thus, as disclosed herein, the gaming system provides a dynamic indicator that forms zero, one or more paths based on the orientation of the open sections and closed sections of the different levels of the award generator. In these embodiments, upon a determination that the indicator indicates a closed section and the formed path, if any, ends (or terminates), the gaming system determines a total award based on the awards of the sections of the award generator indicated by the indicator of the award generator and any path formed, via the alignment of zero, one or more marked open sections, in association with the indicator. The gaming system disclosed herein, thus, provides a dynamic indicator wherein for different plays of the game, the quantity of sections of the award generator that the indicator indicates (and marks) varies based on the orientation of the open sections of the different levels of the award generator. Such a configuration alters the volatility of the gaming system (and thus alters the operation of the gaming system) by ensuring that different indicators are utilized based on the random determinations of the award generator itself.

In this example embodiment, the gaming system determines the award by: (1) summing the credit values associated with each of the marked open sections of the outer wheel, (2) summing the multipliers associated with each of the marked open sections of the middle wheel and the inner wheel, and (3) applying the summed multiplier to the summed credit value. For example, referring to FIG. 2G, the gaming system adds the credit values associated with the first marked open section 212*a* (i.e., an award of 300 credits), the second marked open section 212*e* (i.e., an award of 800 credits), and the third marked open section 212*f* (i.e., an award of 900 credits) to determine a summed credit value of 2000 credit values. The gaming system then adds the multipliers associated with the first marked open section 217*a* of the middle wheel 215 (i.e., an award of a 4× multiplier), the second marked open section 217*b* of the middle wheel 215 (i.e., an award of a 3× multiplier), and the marked open section 222*a* of the inner wheel 220 (i.e., an award of a 7× multiplier) to determine a summed multiplier of 14×. The gaming system then determines the award by applying the summed multiplier (i.e., 14×) to the summed credit value (i.e., 2000 credit values) to determine an award of 28,000 credits.

After determining the award based on the marked open section(s) of the award generator, the gaming system displays the determined award, as indicated by block 145. Referring to FIG. 2G, the gaming system displays the following message in the message box 270: “You win 28,000 Credits!” The gaming system also updates the value displayed by the bonus award meter 260 to include the determined award.

In this example embodiment, the gaming system determines the award by: (1) summing the credit values associated with each of the marked open sections of the outer wheel, (2) summing the multipliers associated with each of the marked open sections of the middle wheel and the inner wheel, and (3) applying the summed multiplier to the summed credit value. In another embodiment, the gaming system determines the award by multiplying the multipliers associated with each of the marked open sections of the middle wheel and the inner wheel, and applying the product of the multipliers to the summed credit value.

In the example embodiment described above with respect to FIGS. 2A-2G, the gaming system is guaranteed to provide an award for each occurrence of the award generator triggering event. In other embodiments, however, the gaming system is not guaranteed to provide an award for an occurrence of the award generator triggering event. For example, one or more closed sections 214 of the outer wheel 210 may be associated with a credit value of zero credits.

In the embodiments described above, the award generator includes one indicator. In other embodiments, however, the award generator includes a plurality of indicators.

In the embodiments described above, the gaming system forms a path by marking one or more open sections that are aligned with the indicator in any direction. In other embodiments, the gaming system forms a path by marking one or more sections that are aligned with the indicator in certain direction(s). For example, the gaming system marks those open section(s) that are aligned with the indicator in a downward direction (when facing the award generator). In other embodiments, the gaming system marks those open section(s) that are aligned with the indicator in an upward direction (when facing the award generator). In other embodiments, the gaming system marks those open section(s) that are aligned with the indicator in a sideways direction (when facing the award generator). In other embodiments, the gaming system marks those open section(s) that are aligned with the indicator in a downward and/or sideways direction (when facing the award generator). In other embodiments, the gaming system marks those open section(s) that are aligned with the indicator in an upward and/or sideways direction (when facing the award generator).

The awards winnable via an occurrence of an award generator triggering event can be any suitable awards such as, but not limited to: (1) monetary credits or currency; (2) non-monetary credits or currency; (3) a modifier (e.g., a multiplier) used to modify one or more awards; (4) one or more free plays of a game; (5) one or more plays of a bonus game (e.g., a free spin of an award wheel, a free spin of the award generator, etc.); (6) one or more lottery based awards (e.g., one or more lottery or drawing tickets); (7) a wager match for one or more plays of the wagering game; (8) an increase in an average expected payback percentage of a bonus game and/or an average expected payback percentage of a primary game for one or more plays; (9) one or more comps (such as a free meal or a free night's stay at a hotel); (10) one or more bonus or promotional credits usable for online play; (11) one or more player tracking points; (12) a multiplier for player tracking points; (13) an increase in a membership or player tracking level; (14) one or more coupons or promotions usable within a gaming establishment or outside of the gaming establishment (e.g., a 20% off coupon for use at a retail store or a promotional code providing a deposit match for use at an online casino); (15) an access code usable to unlock content on the Internet; (16) a progressive award; (17) a high value product or service (such as a car); and/or (18) a low value product or service.

In certain embodiments, one or more of the open sections 214 of the outer wheel 210 may be associated with a secondary award that is awarded when the gaming system marks the corresponding open section 214.

In the embodiments described above, the plurality of different levels are concentric wheels. In other embodiments, the plurality of different levels take any other suitable shape or shapes and/or configuration. For example, the plurality of different levels includes a plurality of concentric squares. In other embodiments, the different levels of the award generator are represented as concentric reels. In other embodiments, the different levels of the award generator are represented as adjacent wheels. In other embodiments, the different levels of the award generator are represented as adjacent squares. In other embodiments, the different levels of the award generator are represented as adjacent reels.

In various embodiments, the duration of each play of the award generator, responsive to an occurrence of an award generator triggering event, may include any suitable period, such as (but not limited to) a period of time, or a quantity of spins. In the example embodiment described above, the duration of the play of the award generator is for a quantity of one spin. In another embodiment, the gaming system provides an unlimited quantity of spins for a designated period of time. Thus, in such an embodiment, the player has an incentive to play quickly and make as many actuations of the spin button as possible during the period of time. In certain embodiments, the period (i.e., the period of time, the quantity of spins or the quantity of durations) is predetermined. In other embodiments, the period is randomly determined. In another embodiment, the gaming system determines the period based on an initial wager amount. In certain embodiments, the gaming system ends the play of the award generator upon a termination event, such as the indication of a particular termination segment. In other words, the gaming system provides unlimited activations of the award generator until the indication of the termination segment.

In certain embodiments, the play of the award generator is a persistence game in which the gaming system maintains the state of the plurality of objects (i.e., which open sections are marked open sections and which open sections are unmarked open sections) from spin to spin.

In certain embodiments, the gaming system switches a marked open section to a closed section after an award is determined for a spin of the award generator. For example, in the embodiment described above, the gaming system switches the marked open sections **212*a*, 212*e*, 212*f*, 217*a*, 217*b*, and 222*a* to closed sections after determining the award of 28,000 credits. In certain embodiments, the gaming system switches a marked open section to a closed section after the marked open section has been included in a designated quantity of award determinations. For example, after the third time that the marked open section 212*a* of the outer wheel 210 is used to determine an award, the gaming system switches the marked open section 212*a*** to a closed section.

In the embodiment described above, each of the plurality of wheels includes a plurality of open sections and a plurality of closed sections. In another embodiment, one or more of the wheels includes one or more open sections and no closed sections. In another embodiment, one or more of the wheels includes one or more closed sections and no open sections.

In the example embodiment described above, the gaming system displays the plurality of concentric wheels on a display of the gaming system. In another embodiment, the gaming system includes a plurality of mechanical objects, such as wheels, for the play of the award generator. In one embodiment, the housing of the gaming system supports a plurality of mechanical wheels, and each of the plurality of mechanical wheels includes a plurality of open sections and a plurality of closed sections. In one example embodiment, a player spins the plurality of mechanical wheels and once the wheels stop, an indicator indicates (e.g., water pours out onto) a section of the outer wheel. If the indicated section of the outer wheel is an open section and is aligned with one or more open sections of the middle wheel and/or the inner wheel, the water continues to pour into the aligned open sections. The gaming system then awards the player an award associated with the open sections that include water.

Alternative Embodiments

It should be appreciated that in different embodiments, one or more of:

i. when an award generator triggering event occurs;
ii. the quantity of different levels of the award generator;
iii. the quantity of open sections included in a level of the award generator;
iv. the quantity of closed sections included in a level of the award generator;
v. the shape or shapes of the different levels of the award generator;
vi. the size of one or more open sections of one or more levels of the award generator;
vii. the size of one or more closed sections of one or more levels of the award generator;
viii. the configuration of the different levels of the award generator;
ix. the awards associated with each of the sections of the different levels of the award generator;
x. the probability of orienting each of the different levels with the indicator of the award generator;
xi. the number of spins of the award generator;
xii. the duration that the award generator may be activated;
xiii. the path direction of the indicator;
xiv. the number of indicators;
xv. which indicators are active for an activation of the award generator; and/or
xvi. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, a central controller, and/or a remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3:
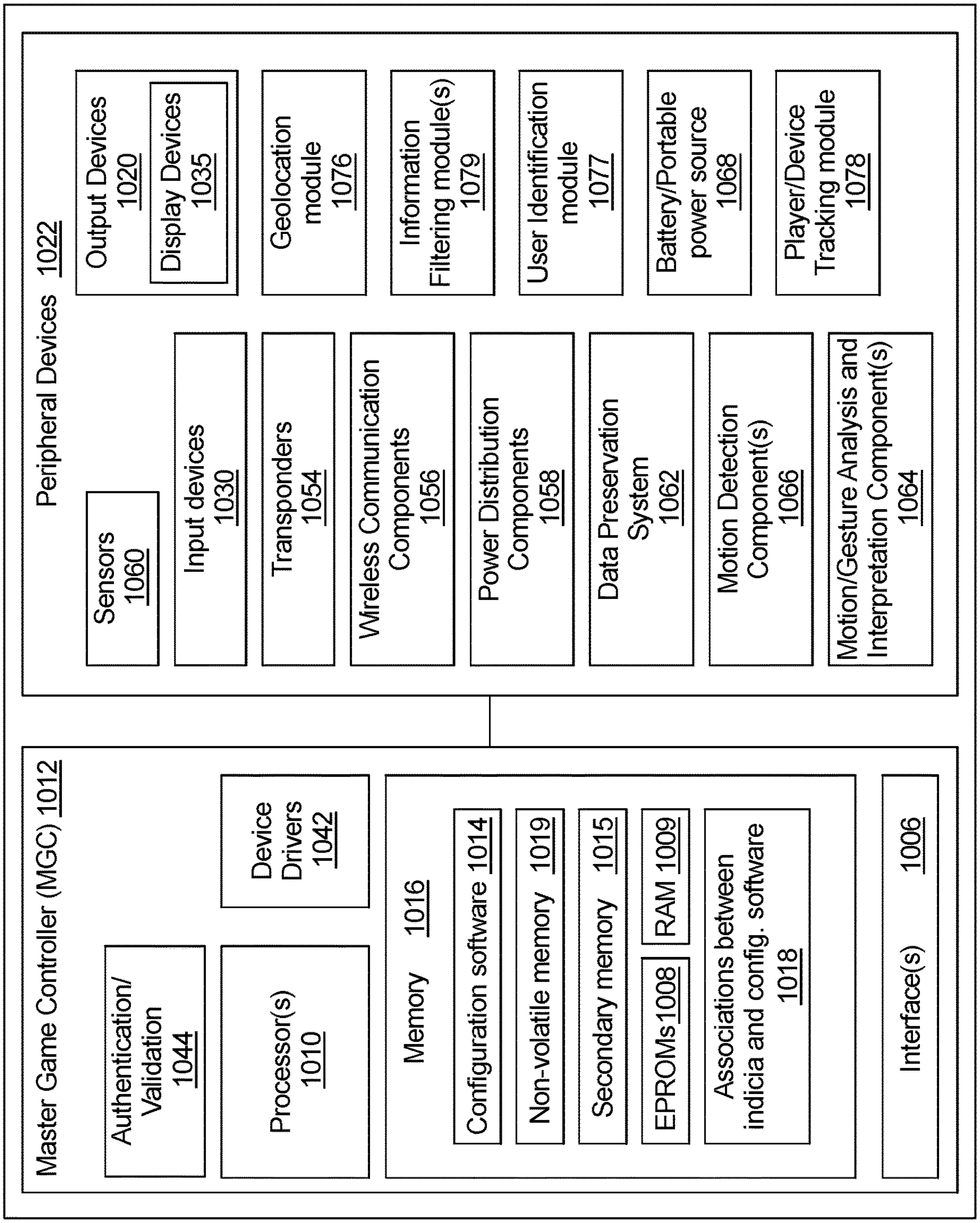
FIG. 3 is a schematic block diagram of one embodiment of an electronic configuration of an example gaming system disclosed herein.
Figure 4A:
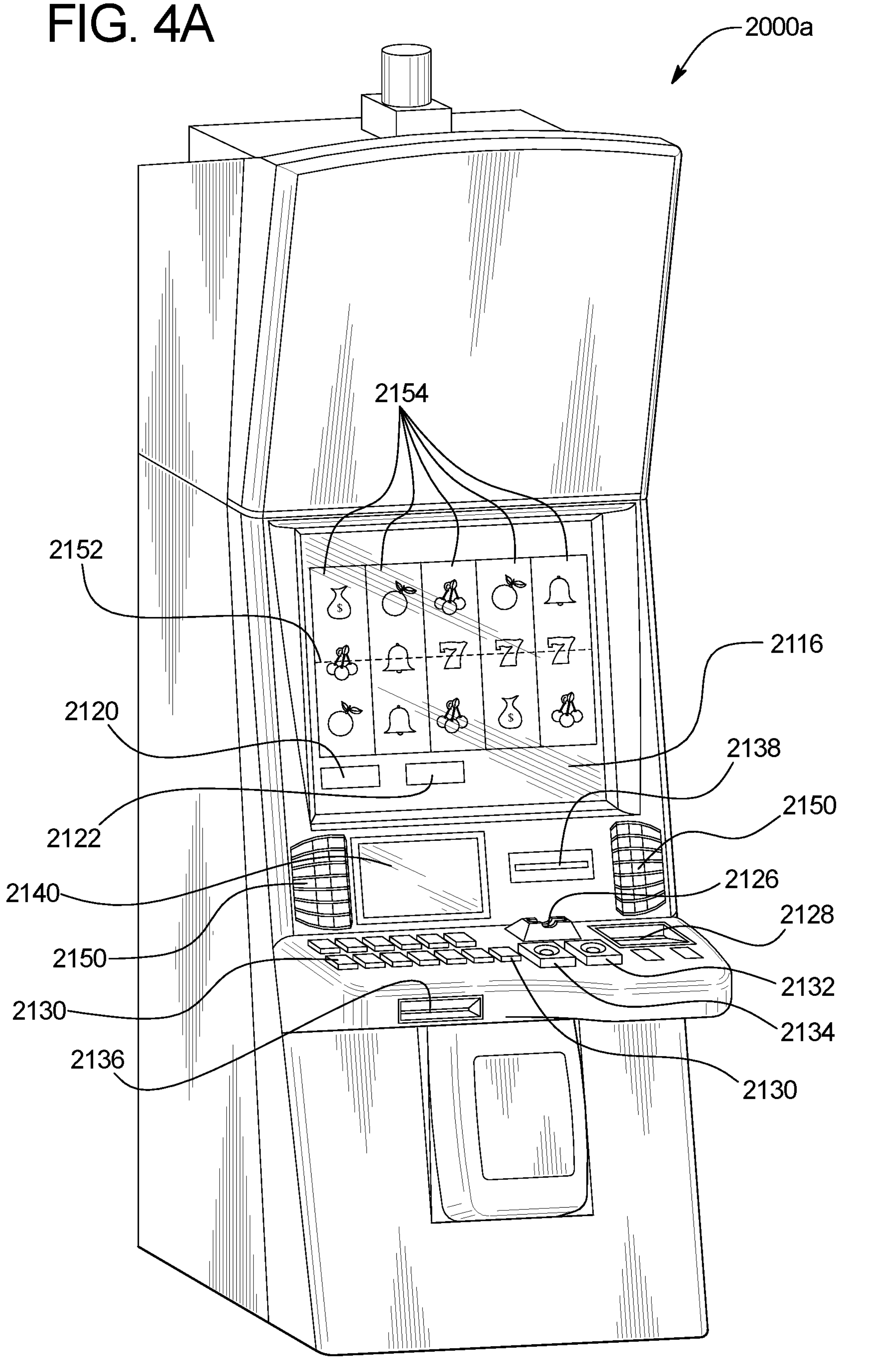
FIGS. 4A and 4B are perspective views of example alternative embodiments of the gaming system disclosed herein.
Figure 4B:
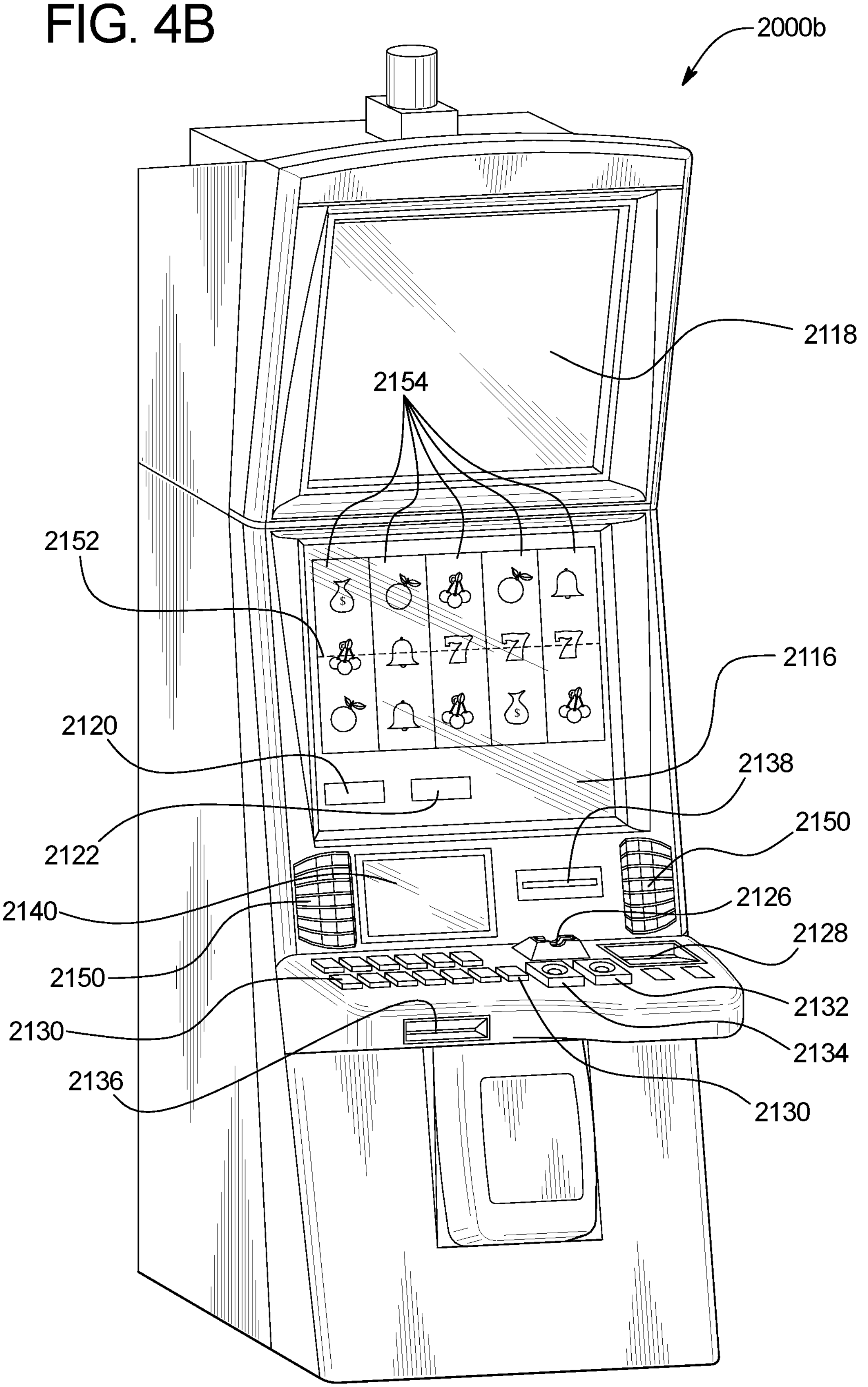
Figure 4C:
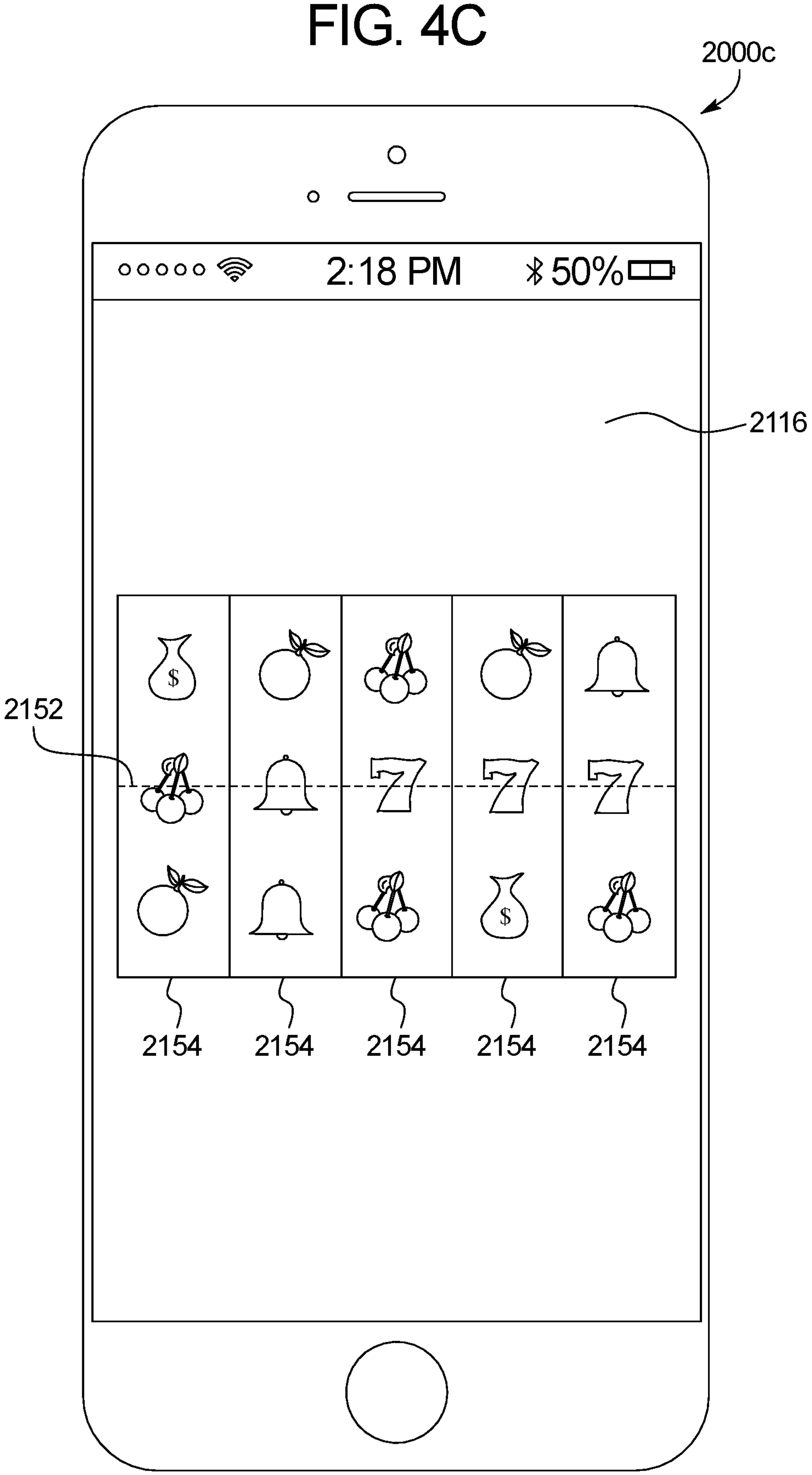
FIG. 4C is a front view of an example personal gaming device of the gaming system disclosed herein.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method."

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine."

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine." When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game."

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern."

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services."

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 4B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations."

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards."

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win."

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services."

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, and/or a facial recognition sensor), and/or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, and/or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines and/or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity."

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network server to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes."

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play."

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents in a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification."

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment."

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System."

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention is claimed as follows:

1. A gaming system comprising:

a processor; and a memory device that stores a plurality of instructions that, when executed by the processor, cause the processor to:

for a first play of a game:

cause a display, by a display device, of an award generator comprising a plurality of different levels, each different level comprises a plurality of sections, wherein at least one of the sections of each different level is statically associated with a displayed award component, cause a display, by the display device, of a first configuration of an indicator of the award generator, wherein the first configuration of the indicator comprises a first quantity of indicated sections of the award generator including a first quantity of non-adjacent open sections of a first single level of the award generator each being indicated, and cause a display, by the display device, of a first award, wherein the first award is based on any displayed award component statically associated with the first quantity of indicated sections of the award generator, and for a second play of a game:

cause a display, by the display device, of the award generator, cause a display, by the display device, of a second, different configuration of the indicator of the award generator, wherein the second configuration of the indicator comprises a second, different quantity of indicated sections of the award generator including a second, different quantity of non-adjacent open sections of a second single level of the award generator each being indicated, and cause a display, by the display device, of a second award, wherein the second award is based on any displayed award component statically associated with the second, different quantity of indicated sections of the award generator.

2. The gaming system of claim 1, wherein the first single level of the award generator and the second single level of the award generator are different levels of the award generator.

3. The gaming system of claim 1, wherein the memory device stores a plurality of further instructions that, when executed by the processor for a third play of the game, cause the processor to:
- cause a display, by the display device, of a third, different configuration of the indicator of the award generator, wherein the third configuration of the indicator comprises the first quantity of indicated sections of the award generator including the second, different quantity of non-adjacent open sections of the second single level of the award generator each being indicated, and
- cause a display, by the display device, of a third award, wherein the third award is based on any displayed award components statically associated with the first quantity of indicated sections of the award generator.

4. The gaming system of claim 1, wherein the memory device stores a plurality of further instructions that, when executed by the processor for a third play of the game, cause the processor to:
- cause a display, by the display device, of a third, different configuration of the indicator of the award generator, wherein the third configuration of the indicator comprises a third, different quantity of indicated sections of the award generator including the first quantity of non-adjacent open sections of the first single level of the award generator each being indicated, and
- cause a display, by the display device, of a third award, wherein the third award is based on any displayed award components statically associated with the third quantity of indicated sections of the award generator.

5. The gaming system of claim 1, wherein a level of the plurality of levels of the award generator comprises a plurality of closed sections.

6. The gaming system of claim 1, wherein the first quantity of sections of the award generator comprises at least two sections of two levels of the award generator.

7. The gaming system of claim 1, wherein the displayed award component statically associated with a first section of one level of the award generator comprises a value and the displayed award component statically associated with a first section of another level of the award generator comprises a multiplier.

8. The gaming system of claim 1, wherein the plurality of levels of the award generator comprise a plurality of concentric wheels.

9. The gaming system of claim 1, wherein the first quantity of sections of the award generator form a path that terminates at one of a plurality of closed sections.

10. A gaming system comprising:
- a processor; and
- a memory device that stores a plurality of instructions that, when executed by the processor responsive to an occurrence of a triggering event, cause the processor to:
  - cause a display, by a display device, of an award generator comprising a plurality of levels, each level comprises a plurality of sections, wherein at least one of the sections of each level is statically associated with a displayed award component,
  - for each of the plurality of levels of the award generator, randomly determine an orientation of that level of the award generator,
  - cause a display, by the display device, of the randomly determined orientation of each of the levels of the award generator,
  - determine an award based on the displayed award components statically associated with any indicated open sections of different levels of the award generator being aligned in accordance with the randomly determined orientation of those different levels, wherein the indicated open sections comprise a first open section of a first level of the plurality of levels that is aligned with a first open section of a second level of the plurality of levels that is aligned with a second open section of the first level of the plurality of levels and the first open section of the first level of the plurality of levels is non-adjacent to the second open section of the first level of the plurality of levels, and
  - cause a display, by the display device, of the determined award.

11. The gaming system of claim 10, wherein a level of the plurality of levels of the award generator comprises a plurality of closed sections.

12. The gaming system of claim 10, wherein the indicated open sections form a path that terminates at a closed section of one of the levels of the award generator.

13. The gaming system of claim 10, wherein the indicated open sections of the award generator comprise at least two sections of the second level of the award generator.

14. The gaming system of claim 10, wherein the displayed award component statically associated with a section of a level of the plurality of levels of the award generator comprises a value and the displayed award component statically associated with a section of another level of the plurality of levels of the award generator comprises a multiplier.

15. The gaming system of claim 10, wherein the plurality of levels of the award generator comprise a plurality of concentric wheels.

16. A gaming system comprising:
- a processor; and
- a memory device that stores a plurality of instructions that, when executed by the processor, cause the processor to:
  - cause a display, by a display device, of an award generator comprising a plurality of levels, each level comprises a plurality of sections, wherein at least one of the sections of each level is statically associated with a displayed award component,
  - for each of the plurality of levels of the award generator, determine an orientation of that level of the award generator,
  - cause a display, by the display device, of the determined orientation of each of the levels of the award generator,
  - determine an award based on the displayed award components statically associated with any indicated open sections of different levels of the award generator, wherein the indicated open sections comprise a first open section of a first level of the plurality of levels, a second open section of the first level of the plurality of levels that is non-adjacent to the first open section of the first level of the plurality of levels, and a first open section of a second level of the plurality of levels, and
  - cause a display, by the display device, of the determined award.

17. The gaming system of claim 16, wherein the indicated open sections form a path that terminates at a closed section.

18. The gaming system of claim 16, wherein the indicated open sections of the award generator comprise at least two open sections of the second level of the award generator.

19. The gaming system of claim 16, wherein the displayed award components statically associated with a section of a level of the plurality of levels of the award generator comprises a value and the displayed award components statically associated with a section of another level of the plurality of levels of the award generator comprises a multiplier.

20. The gaming system of claim 16, wherein the plurality of levels of the award generator comprise a plurality of concentric wheels.

* * * * *